F. BEEMER.
BALL GRINDING MACHINE.
APPLICATION FILED SEPT. 24, 1908.
1,014,747.
Patented Jan. 16, 1912.
2 SHEETS—SHEET 1.
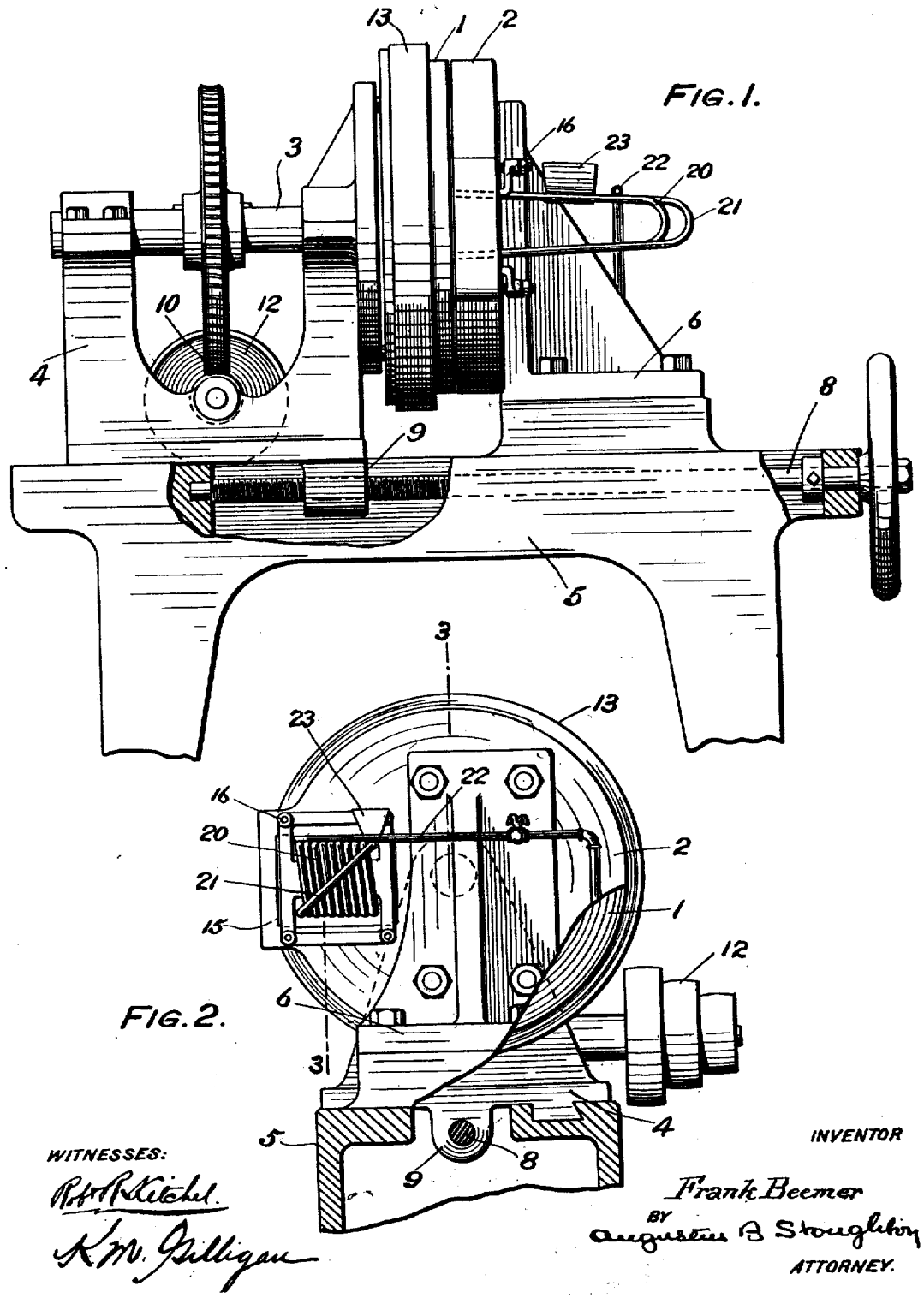

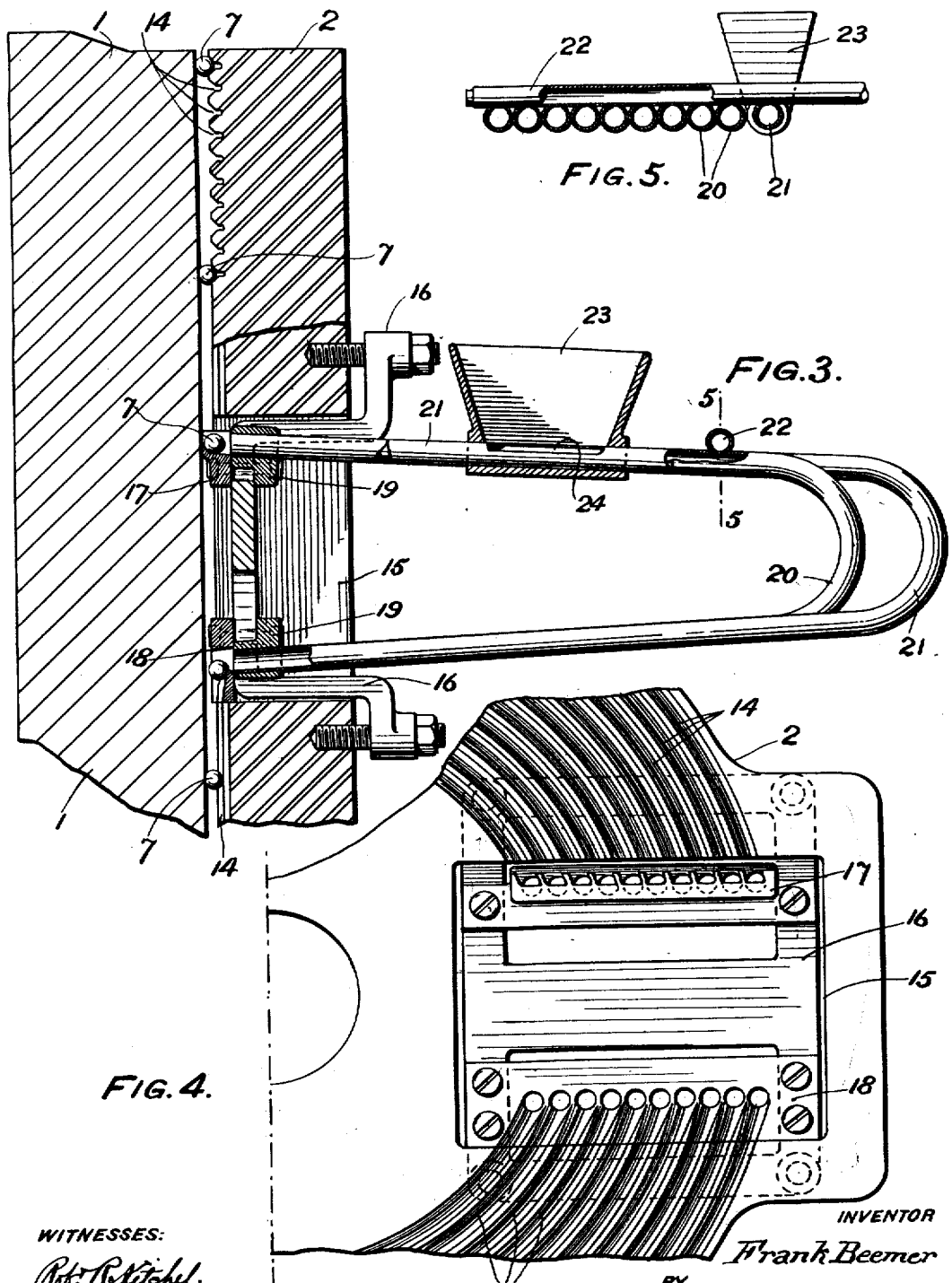

UNITED STATES PATENT OFFICE.

FRANK BEEMER, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

BALL-GRINDING MACHINE.

1,014,747.  Specification of Letters Patent.  Patented Jan. 16, 1912.

Application filed September 24, 1908. Serial No. 454,592.

*To all whom it may concern:*

Be it known that I, FRANK BEEMER, a citizen of the United States, residing at Philadelphia, in the county of Philadelphia and State of Pennsylvania, have invented a certain new and useful Ball-Grinding Machine, of which the following is a specification.

Letters Patent of the United States No. 624,032 describe a ball grinding machine consisting of a pair of concentric disks furnished with a series of circular grooves on their meeting faces and one of said disks is provided with an open space to permit the balls to change from one groove to another as they are carried around again and again. The mode of operation of that machine is such that the balls are ground between the relatively rotating bodies or disks while they travel in paths concentric with the axis of rotation.

The object of the present invention is to compel each ball of the series of balls, which fills the grooves of the rotating bodies to traverse each of the grooves successively and continuously, thus hastening the operation and at the same time producing balls which are mathematically spherical, are of almost mathematically the same size and present a smooth and perfect surface.

The invention will be claimed at the end hereof, but will first be described in connection with the embodiment of it chosen for illustration in the accompanying drawings, in which—

Figure 1, is a side view with parts broken away of a machine embodying features of the invention. Fig. 2, is an end view with parts broken away looking toward the left in Fig. 1. Fig. 3, is a sectional view drawn to an enlarged scale and taken on the line 3—3 of Fig. 2. Fig. 4, is an elevational view of one of the disks, and Fig. 5, is a sectional view taken on the line 5—5 of Fig. 3.

In the drawings 1 and 2, are disks or bodies arranged concentrically and face to face and adapted to operate upon balls, the material thereof being properly selected for the accomplishment of the required operation. The disk 1 is revoluble and for this purpose is shown as mounted upon a shaft 3, revolubly mounted in a head 4 that is adjustable as in suitable ways on the frame or table 5. The disk 2, is carried by or secured to a support 6, that is rigidly connected with the frame or table. Pressure upon the balls 7, between the disks is exerted by pressing the disk 1 toward the disk 2, for example by means of the hand screw 8, which engages a nut 9 on the head 4 and is itself revolubly mounted but held against endwise movement in the frame or table 5. The worm and worm-wheel 10, together with the shaft and pulley 12, are an example of means for revolving the disk 1.

13, is a guard or housing which may be provided for holding the disk 1.

The disk 1, may be used in connection with liquid, such as oil or water, where the grinding is done between a moving emery or equivalent grinding disk and a stationary metallic holder, as in Letters Patent No. 747,542 to Eveland.

Referring to Fig. 3, the concentric circular grooves 14 in the grinding disk 2, are so shaped in the metal thereof that the balls in their travel describe circles and at the same time rotate in substantially all directions about their own centers; thus the balls are presented to the emery or equivalent grinding material of the grinding disk 1, in rotation in a variety of directions around their own centers, while traveling in circular paths. The rotation of the balls in all directions about their own centers is an important feature in grinding them accurately to size and sphericity and in properly finishing their surfaces. In time, concentric grooves of more or less annular cross-section are formed in the disk 1, but their presence or absence is not material for the accomplishment of the grinding operation which is due to the described rotation of the balls about their own centers and not to any peculiarity in the configuration of the face of the grinding disk 1, and takes place even when grooves are worn in the latter, provided, of course, that the grooves are not too deep.

There is an opening 15, through the grinding disk 2, just as there is in the Hill machine to which reference has been made and as in that machine the purpose of this opening is to enable the balls to be transferred from one of the concentric grooves to another. Into this opening 15 is inserted a bracket 16 which carries a hard metal plate 17, notched on its edge to correspond with each of the grooves on the grinder 2, so that the low parts of the notches are in alinement with the low parts of the grooves. The purpose of this plate 17, is to resist wear since it can be made of harder metal than would be convenient in the manufacture of the grinding disk 2. There is also carried by the bracket 16, another hard metal plate 18, which is provided with openings and grooves that are alined with each of the grooves on the grinding disk 2. The bracket 16 also carries what may be called two plates or heads 19, having holes through them, which holes are alined with the grooves in the hard metal plates 17 and 18 and in consequence with the grooves in the grinding disk 1. In speaking of the member 2 and in fact of the member 1, as disks, it must be borne in mind that externally they may not be circular, but are circular in the sense of the function which they perform in that the balls travel in circles and if the members are not circular the result is simply that they contain useless material.

There are tubes 20, shown as of the general form of the letter U, but with the arms thereof divergent. The ends of these tubes are fitted in the tube plates 19, and terminate flush with the picker and delivery plates 17 and 18 or more accurately with the ball channels in the latter. By reason of their shape these tubes present an inclined path for the travel of the balls through them. One end of each tube communicates with a groove between the faces of the grinding disks and the other end communicates with another groove. As shown in Fig. 2 and considering the tubes from left to right, the left-hand tube communicates with the outside groove and with the next from the outside groove and similarly the remaining tubes communicate with these grooves until the right-hand tube communicates with the next to the inside groove. The inside and outside grooves are connected by a tube 21, which straddles the other tubes. Balls therefore in continuous succession are transferred from the inside groove to the outside groove by the tube 21 and the tubes 20 serve to transfer the balls from one groove to the next, so that the balls travel through the grooves and tubes from the outside groove to the inside and then from the inside groove back to the outside groove, etc. Of course, the invention contemplates an arrangement of the tubes in which the direction of travel of the balls may be somewhat different, for example, from the inside to the outside. The tubes constitute separate channels or means for compelling the balls to traverse the desired path or paths and thus each ball is constrained to travel in the prescribed path. The result of this is the attainment of accuracy in the size of the balls, sphericity in the shape of the balls, and smoothness of finish, as well as expedition in the grinding operation.

22, is a pipe ranging crosswise of the tubes and communicating with each and it serves for the introduction of whatever fluid may be required in the grinding operation, such as oil or water.

23, is a hopper having at its base a sleeve fitted to the pipe 21 so that the hopper may be turned in the position shown to communicate with the interior of the tube 21 through the opening 24 in the tube and may be turned downward so as to close that opening. The opening 24 affords means by which balls may be introduced and removed for example they may be removed as by means of a magnet and tested in order to ascertain the progress of the grinding operation.

In connection with Fig. 3, it may be said that the illustration of the groove 14 at the bottom of that figure is somewhat conventional and is so made for clearness of illustration.

I do not specifically claim herein the part 2 or ball holder which causes the balls as they travel in circular paths to each rotate about changing poles and thus present different equatorial zones to the part 1, as that is the subject matter of my application Serial No. 454,591, nor do I specifically claim the process of treating balls which consists in causing them to each rotate about changing polar axes and present changing equatorial zones, as they travel in circles between concentrically rotating bodies, as the same is the subject matter of my application Serial No. 454,590, but

What I claim is—

1. In a ball machine the combination with a pair of relatively rotating bodies furnished with a series of concentric grooves on their meeting faces and adapted to operate upon balls carried around between them, of a series of independent tubular channels respectively having their ends in communication with different grooves of the series, whereby each of the balls is compelled to progressively change from one groove to another as the balls are carried around again and again.

2. In a ball machine the combination with a pair of relatively rotating bodies furnished with a series of concentric grooves on their meeting faces and adapted to operate upon balls carried around between them, of a series of generally U-shaped tubes having their ends in communication with different grooves of the series, whereby each of the balls is compelled to progressively change from one groove to another as the balls are carried around again and again.

3. In a ball machine the combination of a pair of relatively rotating bodies furnished with a series of concentric grooves on their meeting faces and of which one has an opening that extends across the grooves, a bracket arranged in the opening and provided with tube plates or heads and with a picker plate and a delivery plate each having ball passages alined with the concentric grooves and a series of tubes having their ends mounted in the openings in the tube heads or plates, substantially as described.

4. In a ball machine the combination with a pair of rotating bodies furnished with a series of concentric grooves, of a series of tubes having each of their ends connected with different grooves of the series, and a pipe ranging crosswise of the tubes and having communication with each for the introduction of liquid or the like, substantially as described.

5. In a ball machine the combination with a pair of relatively rotating bodies furnished with a series of concentric grooves on their meeting faces of means for connecting the respective grooves of the series which include a tube having an opening for the introduction and withdrawal of balls, and a hopper having a sleeve mounted on said tube and said sleeve adapted to open and close said opening, substantially as described.

In testimony whereof I have hereunto signed my name.

FRANK BEEMER.

Witnesses:
CLIFFORD K. CASSEL,
FRANK E. FRENCH.

Copies of this patent may be obtained for five cents each, by addressing the "Commissioner of Patents, Washington, D. C."